(12) United States Patent
Chen

(10) Patent No.: US 11,644,040 B2
(45) Date of Patent: May 9, 2023

(54) SECOND-ORDER SLIDING MODE OBSERVATION-BASED FAN POWER CONTROL METHOD AND SYSTEM

(71) Applicant: INSPUR SUZHOU INTELLIGENT TECHNOLOGY CO., LTD., Jiangsu (CN)

(72) Inventor: Zhiyu Chen, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 17/779,249

(22) PCT Filed: Nov. 16, 2020

(86) PCT No.: PCT/CN2020/117340
§ 371 (c)(1),
(2) Date: May 24, 2022

(87) PCT Pub. No.: WO2021/155665
PCT Pub. Date: Aug. 12, 2021

(65) Prior Publication Data
US 2022/0412367 A1    Dec. 29, 2022

(30) Foreign Application Priority Data

Feb. 3, 2020   (CN) .................. 202010078880.X

(51) Int. Cl.
*F04D 27/00* (2006.01)
*G05B 19/4155* (2006.01)
*F04D 25/06* (2006.01)

(52) U.S. Cl.
CPC ............ *F04D 27/00* (2013.01); *F04D 25/06* (2013.01); *G05B 19/4155* (2013.01); *G05B 2219/50333* (2013.01)

(58) Field of Classification Search
CPC ..... F04D 27/00; F04D 25/06; G05B 19/4155; G05B 2219/50333
See application file for complete search history.

(56) References Cited

U.S. PATENT DOCUMENTS

| | | | | |
|---|---|---|---|---|
| 2012/0096885 A1* | 4/2012 | Mak | ....................... | B60K 16/00 |
| | | | | 62/235.1 |
| 2012/0176102 A1* | 7/2012 | Kim | ........................ | G05F 1/67 |
| | | | | 323/234 |
| 2015/0050121 A1 | 2/2015 | Wu | | |

FOREIGN PATENT DOCUMENTS

| | | |
|---|---|---|
| CN | 101127500 A | 2/2008 |
| CN | 101931353 B * | 1/2010 |

(Continued)

OTHER PUBLICATIONS

Basin et al., Multivariable continuous fixed-time second-order sliding mode control: design and convergence time estimation, 2017, IET Control Theory & Applications, vol. 11, Issue 8, p. 1104-1111, (Year: 2017).*

(Continued)

*Primary Examiner* — Kidest Bahta
(74) *Attorney, Agent, or Firm* — Cooper Legal Group, LLC

(57) ABSTRACT

Provided area second-order sliding mode observation-based fan power control method and system. The method includes: calculating, by second-order sliding mode observation, an observed rotational speed value of a fan, and calculating a maximum power reference current corresponding to maximum power of the fan according to a relational expression between the rotational speed and maximum power point; and performing, by controlling a Pulse Width Modulation (PWM) switch to be toggled, system Maximum Power Point (Continued)

Tracking (MPPT) according to the maximum power reference current, so as to control the fan to operate stably at the maximum power point.

10 Claims, 2 Drawing Sheets

(56) References Cited

FOREIGN PATENT DOCUMENTS

| | | |
|---|---|---|
| CN | 104373366 A | 2/2015 |
| CN | 107070337 A | 8/2017 |
| CN | 107476937 A | 12/2017 |
| CN | 109347382 A | 2/2019 |
| CN | 111237233 A | 6/2020 |
| JP | 2000207034 A | 7/2000 |

OTHER PUBLICATIONS

International Search Report of corresponding PCT application PCT/CN2020/117340, dated Dec. 30, 2020, 6 pages.

Written Opinion of International Searching Authority of corresponding PCT application PCT/CN2020/117340, dated Dec. 30, 2020, 9 pages.

First Office Action of corresponding CN priority application CN202010078880.X, dated Mar. 1, 2021, 9 pages.

* cited by examiner

SECOND-ORDER SLIDING MODE OBSERVATION-BASED FAN POWER CONTROL METHOD AND SYSTEM

BACKGROUND

The present application claims priority to Chinese Patent Application No. 202010078880.X, filed to the China National Intellectual Property Administration on Feb. 3, 2020, and entitled "Second-Order Sliding Mode Observation-Based Fan Power Control Method and System", the contents of which are hereby incorporated by reference in its entirety.

FIELD

The present invention relates to fan power control technology, and particularly to a second-order sliding mode observation-based fan power control method and system.

Generally, common service includes a Baseboard Management Controller (BMC) chip. The BMC serves as a network gateway between system management software and Intelligent Platform Management Bus (IPMB) and Intelligent Chassis Management Bus (ICMB) interfaces, as well as an interface between the management software and management hardware of a control system. Each managed component may be managed and controlled by communication with the BMC. A rotational speed of a fan is controlled and managed by the BMC as follows: the rotational speed of the fan and a temperature of a Central Processing Unit (CPU) are sensed, and when the temperature of the CPU is too high or the rotational speed of the fan is too low, warning information is sent out. When the temperature of the CPU is too high, the rotational speed of the fan is increased. The rotational speed of the fan is adjusted automatically according to the temperature of the CPU, thereby ensuring more efficient operation of the fan.

In a common method for controlling a rotational speed of a fan, main unit hardware information is obtained by a BMC, such as information about a temperature of a CPU, a rotational speed of a fan, a voltage value, and a power state. An instruction is given to send request message data, and information about a present state of hardware is returned, such as information about the temperature of the CPU, the rotational speed of the fan, the voltage value, and the power state. Then, response message data is returned. If a present temperature of the CPU is too high, exceeding a hardware event occurrence threshold value, the BMC sends a Simple Network Management Protocol (SNMP) trap to a central management server. When the temperature of the CPU is too high, the rotational speed of the fan is increased such that the CPU temperature returns to a normal numerical value. The rotational speed of the fan is adjusted automatically with the temperature of the CPU. A corresponding measure is used to resolve this event.

There is a response delay if the rotational speed is controlled by sensing the hardware threshold value. When the system fan is kept at a high rotational speed, if monitored hardware, such as the CPU, has returned to a normal temperature, the BMC reads that the temperature of the CPU has fallen to normal, and the fan needs no more to operate a high speed, a Pulse Width Modulation (PWM) signal is adjusted to reduce the rotational speed of the fan to a medium/low rotational speed. In this process, time needed by information transmission and rotational speed adjustment may bring unnecessary energy loss of the fan.

SUMMARY

In order to solve the foregoing technical problem, embodiments of the present application provide a second-order sliding mode observation-based fan power control method and system. Wherein a maximum power point of a system fan is estimated by a nonlinearly controlled second-order sliding mode observer to further control the system fan to keep operating at the maximum power point, thereby realizing automatic system fine-tuning and automatic hardware fine-tuning to make the system and hardware more efficient.

In order to achieve the objective of the present application, in an aspect, the embodiments of the present application provide a second-order sliding mode observation-based fan power control method, including:

calculating, by second-order sliding mode observation, an observed rotational speed value of a fan, and calculating a maximum power reference current corresponding to maximum power of the fan according to a relational expression between the rotational speed and maximum power point; and performing, by controlling a PWM switch to be toggled, system Maximum Power Point Tracking (MPPT) according to the maximum power reference current, so as to control the fan to operate stably at the maximum power point.

Further, the method includes: constructing a second-order sliding mode differential estimator using a second-order sliding mode algorithm, so as to obtain a current error differential signal.

Further, the method includes:

constructing a current error signal differential estimator using a super-twisting algorithm.

Further, the method includes:

processing, by two parallel linearly independent first-order current models, a neutral point voltage of a brushless direct-current motor of the fan into a state space form of line voltage.

Further, the method includes:

forming, by a line current error of the brushless direct-current motor, a sliding mode surface.

In another aspect, the embodiments of the present application also provide a second-order sliding mode observation-based fan power control system, including:

a second-order sliding mode observer, configured to calculate, by second-order sliding mode observation, an observed rotational speed value of a fan, and calculate a maximum power reference current corresponding to maximum power of the fan according to a relational expression between the rotational speed and maximum power point; and a tracking controller, configured to perform, by controlling a PWM switch to be toggled, system MPPT according to the maximum power reference current, so as to control the fan to operate stably at the maximum power point.

Further, the second-order sliding mode observer is configured to construct a differential estimator using a second-order sliding mode algorithm, so as to obtain a current error differential signal.

Further, the second-order sliding mode observer is configured to:

construct a current error signal differential estimator using a super-twisting algorithm.

Further, the second-order sliding mode observer is configured to:

process, by two parallel linearly independent first-order current models, a neutral point voltage of a brushless direct-current motor of the fan into a state space form of line voltage.

Further, the second-order sliding mode observer is configured to:

form, by a line current error of the brushless direct-current motor, a sliding mode surface.

According to the embodiments of the present application, an observed rotational speed value of the fan is calculated by second-order sliding mode observation, and the maximum power reference current corresponding to maximum power of the fan is calculated according to the relational expression between the rotational speed and maximum power point. System MPPT is performed by controlling a PWM switch to be toggled according to the maximum power reference current, so as to control the fan to operate stably at the maximum power point. According to the embodiments of the present application, the maximum power point of the system fan is estimated by a nonlinearly controlled second-order sliding mode observer to further control the system fan to keep operating at the maximum power point, thereby realizing automatic system fine-tuning and automatic hardware fine-tuning to make the system and hardware more efficient.

Other characteristics and advantages of the present application will be described in the following specification, and moreover, partially become apparent from the specification or are understood by implementing the present application. The objective and other advantages of the present application may be achieved by structures particularly pointed out in the specification, the claims, and the drawings.

BRIEF DESCRIPTION OF THE DRAWINGS

The drawings are used to provide further understandings of the technical solutions of the present application, constitute a part of the specification, serve to explain, together with the embodiments of the present application, the technical solutions of the present application, and do not form limitations on the technical solutions of the present application.

DETAILED DESCRIPTION

In order to make the objectives, technical solutions, and advantages of the present application clearer, the embodiments of the present application will be described below in detail in combination with the drawings. It is to be noted that the embodiments of the present application and characteristics in the embodiments may be combined freely without conflicts.

The steps shown in the flowcharts of the drawings may be executed in a computer system capable of executing instructions, such as a group of computers. Moreover, although logic sequences are shown in the flowcharts, the shown or described steps may be executed in sequences different from those shown herein in some circumstances.

Figure 1:
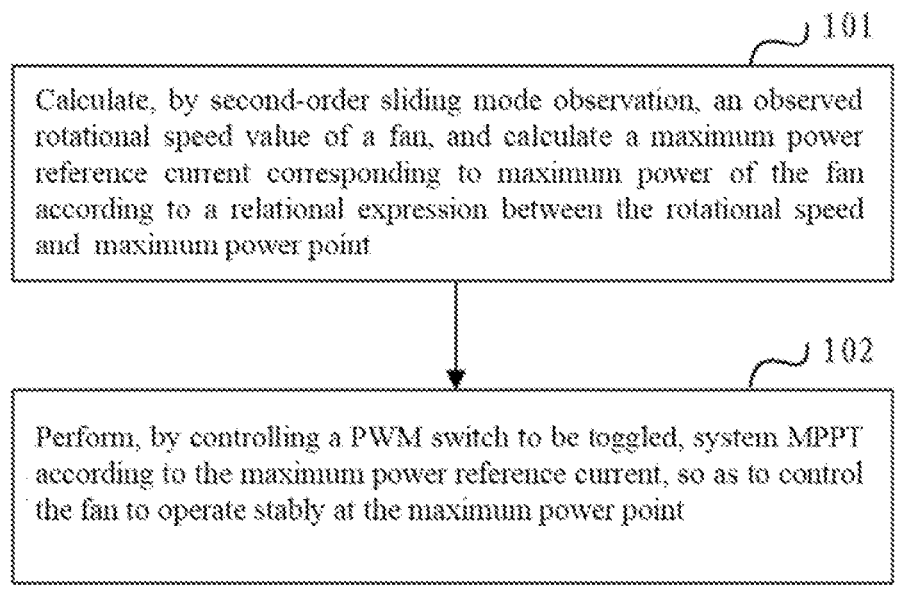
FIG. 1 is a flowchart of a second-order sliding mode observation-based fan power control method according to an embodiment of the present application.

FIG. 1 is a flowchart of a second-order sliding mode observation-based fan power control method according to an embodiment of the present application. As shown in FIG. 1, the method of the embodiment of the present application includes the following steps.

At step 101, calculate, by second-order sliding mode observation, an observed rotational speed value of a fan, and calculate a maximum power reference current corresponding to maximum power of the fan according to a relational expression between the rotational speed and maximum power point.

At step 102, perform, by controlling a Pulse Width Modulation (PWM) switch to be toggled, system Maximum Power Point Tracking (MPPT) according to the maximum power reference current, so as to control the fan to operate stably at the maximum power point.

Specifically, in the embodiment of the present application, a rotational speed observer is designed for the system fan. After a maximum power reference current is calculated according to an observed rotational speed value, system MPPT is performed by controlling a PWM switch to be toggled. The rotational speed observer is designed based on a second-order sliding mode observer theory, and finite-time error convergence is ensured. After the rotational speed of the fan is calculated accurately, an output reference current value corresponding to maximum power of the fan may be calculated according to a relational expression between the rotational speed and maximum power point. The fan is controlled by a sliding mode controller to operate stably at the maximum power point, thereby achieving optimal management of the system and hardware.

A principle of sliding mode control is as follows: a phase trajectory passing a balance point is set manually, and a system state point is stabilized asymptotically by appropriate design to the balance point along the phase trajectory, or evocatively, slides to the balance point. The advantage is that a sliding mode may be designed independent of object parameters and disturbances, thereby achieving quick response, insensitivity to parameter variations and disturbances, i.e., robustness, and simplicity for physical implementation and avoiding online recognition of the system. The shortcoming is that the state trajectory, after reaching a sliding mode surface, is unlikely to slide to the balance point strictly along the sliding mode surface but approaches the balance point by extending between both sides of the sliding mode surface, thereby generating chattering.

Second-order sliding mode is an effective method for eliminating chattering and phase delay. In this method, discontinuous control acts on a higher-order differential rather than first-order differential of a sliding mode variable. Therefore, not only are all advantages of first-order sliding mode control retained, but also chattering and phase delay may be weakened.

Figure 2:
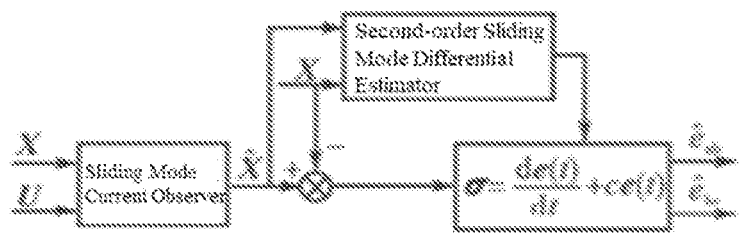
FIG. 2 is a schematic diagram of a second-order sliding mode observation-based fan power control method according to an embodiment of the present application.

FIG. 2 is a schematic diagram of a second-order sliding mode observation-based fan power control method according to an embodiment of the present application. As shown in FIG. 2, the embodiment of the present application is further described in detail as follows.

Voltage and current equations of a three-phase winding of a direct-current motor of the fan are represented as follows:

$$\begin{cases} u_{a0} = Ri_a + L_S \dfrac{di_a}{dt} + e_a + u_n \\ u_{b0} = Ri_b + L_S \dfrac{di_b}{dt} + e_b + u_n \\ u_{c0} = Ri_c + L_S \dfrac{di_c}{dt} + e_c + u_n \end{cases}$$

$$i_a + i_b + i_c = 0,$$

wherein $u_{a0}$, $u_{b0}$, and $u_{c0}$ represent voltages of three phases a, b, and c of a stator winding respectively; R represents impedance; $i_a$, $i_b$, and $i_c$ represent currents of the three stator phases a, b, and c respectively; $L_S$ represents equivalent inductance;

$$\dfrac{di_a}{dt}, \dfrac{di_b}{dt}, \dfrac{di_c}{dt},$$

represent time integrals of the currents of the three phases a, b, and c respectively; $e_a$, $e_b$, and $e_c$ represent counter electromotive forces of the three stator phases a, b, and c respectively; and $u_n$ represents a unit unidirectional constant.

Since it is hard to detect a neural point voltage of the brushless direct-current motor directly, the formula is simplified into two parallel linearly independent first-order current models to process the neutral point voltage into a state space form of line voltage as follows:

$\dot{X} = AX + B(U - E)$ $Y = CX,$ wherein parameter X represents a calculated value of the current of the winding, parameter E represents a value of a line counter electromotive force of the winding, and parameter U represents a calculated value of a line voltage of the winding. The line counter electromotive force may be calculated directly by the first formula above.

Parameters A, B, and C may be calculated by the following formulas:

$$A = \begin{bmatrix} -\dfrac{R}{L_S} & 0 \\ 0 & -\dfrac{R}{L_S} \end{bmatrix}; B = \begin{bmatrix} \dfrac{1}{L_S} & 0 \\ 0 & -\dfrac{1}{L_S} \end{bmatrix}; C = [1 \ 1].$$

A second-order sliding mode observer for the brushless direct-current motor is constructed as follows:

$\dot{\hat{X}} = A\hat{X} + B(U + Z)$ wherein Z represents a control quantity of the second-order sliding mode observer.

After calculation, a state error equation of the brushless direct-current motor may be obtained as follows:

$\dot{\tilde{X}} = A\tilde{X} + B(E + Z).$

When the sliding mode surface exists and converges in finite time, the following equations may be obtained:

$\dot{\tilde{i}}_{ab} = \tilde{i}_{ab} = 0, \dot{\tilde{i}}_{bc} = \tilde{i}_{bc} = 0,$ $[Z_1 Z_2]^T = [-e_{ab} - e_{bc}]^T.$ The sliding mode surface of the second-order sliding mode observer is selected to be:

$$\sigma = \dfrac{de(t)}{dt} + ce(t).$$

wherein σ represents the sliding mode surface formed by a line current error of the brushless direct-current motor, and c represents a constant.

$\sigma = [\sigma_1 \ \sigma_2]^T.$

The addition of constant c may accelerate convergence freely. According to a design requirement of sliding mode control, control needs to ensure the convergence of sliding mode variables $\sigma_1$ and $\sigma_2$ to zero.

A differential estimator is constructed using a second-order sliding mode algorithm to estimate a current error differential signal. An input of the differential estimator is set to a current error signal e(t). A differential of the current error signal is:

$$\dfrac{de(t)}{dt} v_0.$$

A sliding modulus and a differential thereof are as follows:

$$\begin{cases} \varepsilon(t) = s_0 - e(t) \\ \dot{\varepsilon}(t) = v_0 - \dot{e}(t) \end{cases}.$$

A current error signal differential estimator is constructed using a super-twisting algorithm as follows:

$$\begin{cases} \dot{z}_{0x} = v_{0x} \\ v_{0x} = \lambda_0 \lfloor z_{0x} - e_x(t) \rfloor^{0.5} \operatorname{sgn}(z_{0x} - e_x(t)) + z_{1x} \\ \dot{z}_{1x} = -\lambda_1 \operatorname{sgn}(z_{0s} - e_x(t)) \\ e(t) = [e_1(t) e_2(t)]^T = [\tilde{i}_{ab}(t) \tilde{i}_{bc}(t)]^T \end{cases}.$$

A sufficient condition for convergence is as follows:

$$\begin{cases} \ddot{e}_1(t) \le C, \ddot{e}_2(t) \le C, C > 0 \\ \lambda_1 > C, \lambda_0^2 \ge 4C \dfrac{\lambda_1 + C}{\lambda_1 - C} \end{cases}.$$

Under the action of a control rate of the super-twisting algorithm, the differential estimator converges after finite time, and there is the following equation:

$v_0 = \dot{e}(t).$

Therefore, the second-order sliding mode differential estimator may obtain the line current error differential signal of the brushless direct-current motor relatively well. The structure of a second-order sliding mode line counter electromotive force observer designed for the direct-current motor of the fan according to the above analysis is shown in FIG. 2.

The embodiment of the present application has the characteristics of quick response and insensitivity to disturbances. The system fan may keep operating at the maximum power point. Unnecessary power loss of the fan may be avoided.

According to the embodiment of the present application, a maximum power point of a system fan is estimated by a nonlinearly controlled second-order sliding mode observer to further control the system fan to keep operating at the maximum power point, thereby realizing automatic system fine-tuning and automatic hardware fine-tuning to make the system and hardware more efficient.

A detailed implementation process of the embodiment of the present application will be described below taking optimizing a fan control circuit as an example.

Figure 3:
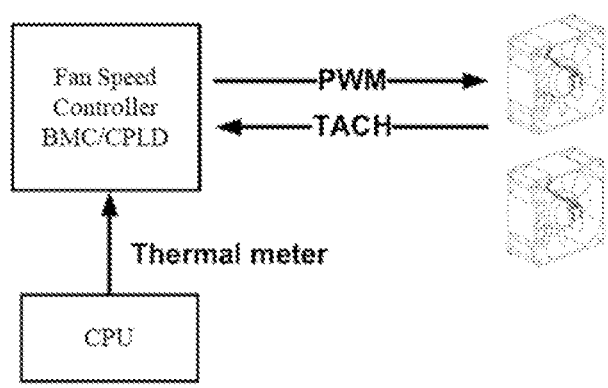
FIG. 3 shows a control circuit of a server and a heat dissipation fan.

FIG. 3 shows a control circuit of a server and a heat dissipation fan. As shown in FIG. 3, the control circuit generally includes a PWM input and a rotational speed pin (Tach). As described above, when the system fan is kept at a high rotational speed, if a monitored hardware component, such as a CPU, has returned to a normal temperature, a fan speed controller BMC or Complex Programmable Logic Device (CPLD) reads through a thermal meter that a temperature of the CPU has dropped to normal level, and the fan needs no more to operate at high speed, a PWM signal is adjusted to reduce the rotational speed of the fan to a medium/low rotational speed. In this process, time needed by information transmission and rotational speed adjustment may bring unnecessary energy loss to the fan.

Therefore, optimization is implemented by the following exemplary method.

Figure 4:
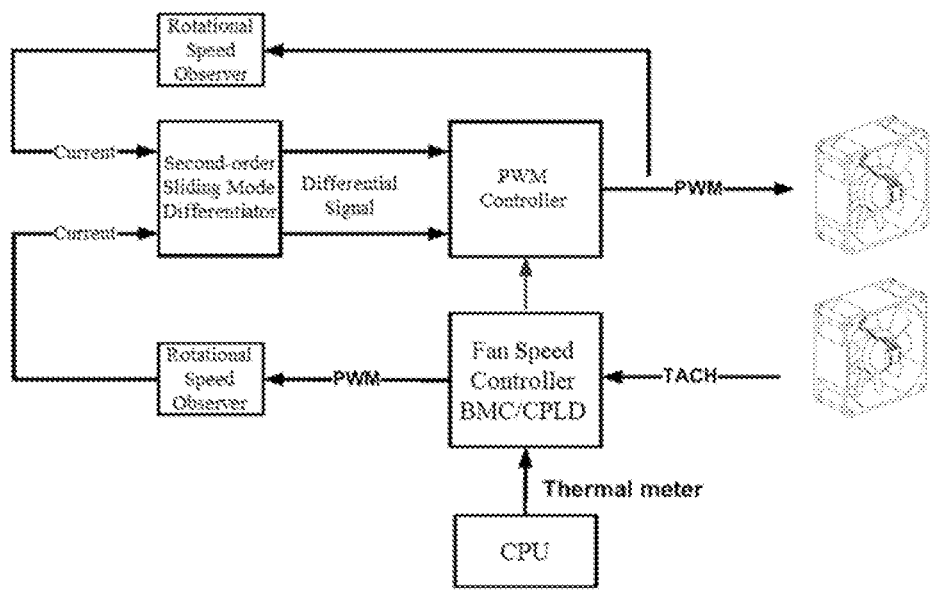
FIG. 4 is a diagram of optimizing a fan control circuit in a second-order sliding mode observation-based fan power control method according to an embodiment of the present application.

FIG. 4 is a diagram of optimizing a fan control circuit in a second-order sliding mode observation-based fan power control method according to an embodiment of the present application. As shown in FIG. 4, a rotational speed observer is designed for the system fan. A maximum power reference current is calculated by PWM output by the PWM controller and PWM output by the fan speed controller BMC or CPLD according to an observed rotational speed value, and then flows through a second-order sliding mode differentiator. The rotational speed observer is designed based on an observer theory, and has finite-time error convergence. After a rotational speed of the fan is calculated accurately, an output reference current value corresponding to maximum power of the fan may be calculated according to a relational expression between a rotational speed and a maximum power point. The fan is controlled by a sliding mode controller to operate stably at the maximum power point, and then the PWM controller outputs PWM to the system fan, thereby achieving the purpose of optimal management of the system and hardware.

According to the embodiment of the present application, the shortcomings of unnecessary power consumption during the operation of the fan and slow response caused by the fact that a conventional server, when controlling a fan, adjusts a rotational speed of the fan only by sensing a temperature feedback may be overcome, system management and hardware control may be enhanced, and server management and a hardware control mechanism may be integrated.

Figure 5:
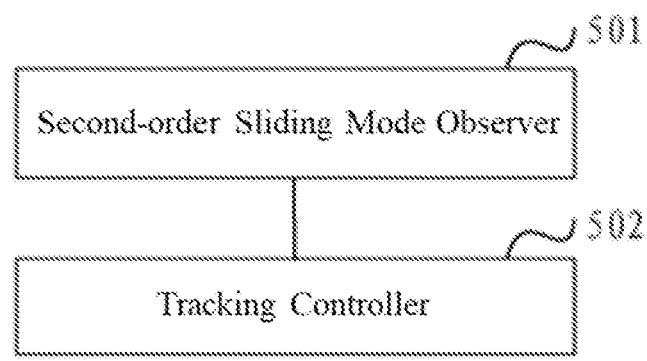
FIG. 5 is a structural diagram of a second-order sliding mode observation-based fan power control system according to an embodiment of the present application.

FIG. 5 is a structural diagram of a second-order sliding mode observation-based fan power control system according to an embodiment of the present application. As shown in FIG. 5, the second-order sliding mode observation-based fan power control system provided in another aspect of the embodiments of the present application includes:

a second-order sliding mode observer 501, configured to calculate, by second-order sliding mode observation, an observed rotational speed value of a fan, and calculate a maximum power reference current corresponding to maximum power of the fan according to a relational expression between the rotational speed and maximum power point; and a tracking controller 502, configured to perform, by controlling a PWM switch to be toggled, system MPPT according to the maximum power reference current, so as to control the fan to operate stably at the maximum power point.

Further, the second-order sliding mode observer 501 is configured to construct a differential estimator using a second-order sliding mode algorithm, so as to obtain a current error differential signal.

Further, the second-order sliding mode observer 501 is configured to:

construct a current error signal differential estimator using a super-twisting algorithm.

Further, the second-order sliding mode observer 501 is configured to:

process, by two parallel linearly independent first-order current models, a neutral point voltage of a brushless direct-current motor of the fan into a state space form of line voltage.

Further, the second-order sliding mode observer 501 is configured to:

form, by a line current error of the brushless direct-current motor, a sliding mode surface.

According to the embodiment of the present application, an observed rotational speed value of a fan is calculated by second-order sliding mode observation, and a maximum power reference current corresponding to maximum power of the fan is calculated according to a relational expression between a rotational speed and a maximum power point. System MPPT is performed by controlling a PWM switch to be toggled according to the maximum power reference current, so as to control the fan to operate stably at the maximum power point. According to the embodiment of the present application, the maximum power point of the system fan is estimated by a nonlinearly controlled second-order sliding mode observer to further control the system fan to keep operating at the maximum power point, thereby realizing automatic system fine-tuning and automatic hardware fine-tuning to make the system and hardware more efficient.

Although the implementation modes of the present application are disclosed above, the contents are only implementation modes only for ease of understanding the present application and not intended to limit the present application. Those skilled in the art may make any modifications and variations to implementation forms and details without departing from the spirit and scope disclosed in the present application. However, the patent protection scope of the present application should also be subject to the scope defined by the appended claims.

The invention claimed is:

1. A second-order sliding mode observation-based fan power control method, characterized by comprising:

calculating, by second-order sliding mode observation, an observed rotational speed value of a fan, and calculating a maximum power reference current corresponding to maximum power of the fan according to a relational expression between the rotational speed and maximum power point; and performing, by controlling a Pulse Width Modulation (PWM) switch to be toggled, system Maximum Power Point Tracking (MPPT) according to the maximum power reference current, so as to control the fan to operate stably at the maximum power point.

2. The second-order sliding mode observation-based fan power control method of claim 1, further comprising:

constructing a second-order sliding mode differential estimator using a second-order sliding mode algorithm, so as to obtain a current error differential signal.

3. The second-order sliding mode observation-based fan power control method of claim 2, further comprising:
constructing a current error signal differential estimator using a super-twisting algorithm.

4. The second-order sliding mode observation-based fan power control method of claim 3, further comprising:
processing, by two parallel linearly independent first-order current models, a neutral point voltage of a brushless direct-current motor of the fan into a state space form of line voltage.

5. The second-order sliding mode observation-based fan power control method of claim 4, further comprising:
forming, by a line current error of the brushless direct-current motor, a sliding mode surface.

6. A second-order sliding mode observation-based fan power control system, characterized by comprising:
a second-order sliding mode observer, configured to calculate, by second-order sliding mode observation, an observed rotational speed value of a fan, and calculate a maximum power reference current corresponding to maximum power of the fan according to a relational expression between the rotational speed and maximum power point; and
a tracking controller, configured to perform, by controlling a Pulse Width Modulation (PWM) switch to be toggled, system Maximum Power Point Tracking (MPPT) according to the maximum power reference current, so as to control the fan to operate stably at the maximum power point.

7. The second-order sliding mode observation-based fan power control system of claim 6, wherein the second-order sliding mode observer is configured to:
construct a differential estimator using a second-order sliding mode algorithm, so as to obtain a current error differential signal.

8. The second-order sliding mode observation-based fan power control system of claim 7, wherein the second-order sliding mode observer is configured to:
construct a current error signal differential estimator using a super-twisting algorithm.

9. The second-order sliding mode observation-based fan power control system of claim 8, wherein the second-order sliding mode observer is configured to:
process, by two parallel linearly independent first-order current models, a neutral point voltage of a brushless direct-current motor of the fan into a state space form of line voltage.

10. The second-order sliding mode observation-based fan power control system of claim 9, wherein the second-order sliding mode observer is configured to:
form, by a line current error of the brushless direct-current motor, a sliding mode surface.

\* \* \* \* \*